US008401470B2

(12) United States Patent
Kroekenstoel et al.

(10) Patent No.: US 8,401,470 B2
(45) Date of Patent: Mar. 19, 2013

(54) TRANSMITTER WITH ADJUSTABLE TRANSMIT LEVEL FOR MAGNETIC LINK

(75) Inventors: Dave Kroekenstoel, Eindhoven (NL); Harry Neuteboom, Eindhoven (NL)

(73) Assignee: NXP B.V., Eindhoven (NL)

( * ) Notice: Subject to any disclaimer, the term of this patent is extended or adjusted under 35 U.S.C. 154(b) by 425 days.

(21) Appl. No.: 12/665,736

(22) PCT Filed: May 8, 2008

(86) PCT No.: PCT/IB2008/051811
§ 371 (c)(1),
(2), (4) Date: Dec. 21, 2009

(87) PCT Pub. No.: WO2009/001234
PCT Pub. Date: Dec. 31, 2008

(65) Prior Publication Data
US 2010/0188170 A1    Jul. 29, 2010

(30) Foreign Application Priority Data
Jun. 27, 2007    (EP) .................................... 07111130

(51) Int. Cl.
*H04B 5/00*    (2006.01)
*H04B 1/02*    (2006.01)

(52) U.S. Cl. .......... 455/41.1; 455/91; 455/333; 333/175

(58) Field of Classification Search .................... 455/91, 455/115.1, 115.3, 333, 522, 41.1, 41.2; 333/172, 333/175; 375/373, 376
See application file for complete search history.

(56) References Cited

U.S. PATENT DOCUMENTS

| 7,133,485 | B1 | 11/2006 | Baird et al. |
| 7,230,503 | B1 | 6/2007 | Huang |
| 7,250,826 | B2 * | 7/2007 | Gabara ...................... 331/117 R |
| 7,977,926 | B2 * | 7/2011 | Williams ...................... 323/223 |
| 2004/0189404 | A1 | 9/2004 | Ravi et al. |

FOREIGN PATENT DOCUMENTS

| EP | 1758261 A1 | 2/2007 |
| WO | 02/093781 A2 | 11/2002 |

OTHER PUBLICATIONS

International Search Report for Int'l Patent Appln. PCT/IB2008/051811 (Aug. 28, 2008).

* cited by examiner

*Primary Examiner* — Quochien B Vuong
(74) *Attorney, Agent, or Firm* — Kramer & Amado P.C.

(57) ABSTRACT

A device, e.g., a hearing aid, has an electronic circuit for wireless communication of a digital signal. The circuit has a driver driving an RLC tank. The driver has a plurality of inverters whose outputs are coupled to a node of the coil via a respective one of multiple capacitors in the tank. The circuit has a controller that selectively drives one or more of the inverters with the digital signal and connects the inputs of the other inverters to a supply voltage or ground. The tank has a further plurality of series arrangements of a further capacitor and a high-voltage switch connected between the node and ground. The controller is configured for controlling the high-voltage switches.

10 Claims, 3 Drawing Sheets

TRANSMITTER WITH ADJUSTABLE TRANSMIT LEVEL FOR MAGNETIC LINK

FIELD OF THE INVENTION

The invention relates to a device with an electronic circuit for wireless communication of a digital signal using a magnetic link. The invention further relates to an integrated circuit for use in such a device.

BACKGROUND ART

The principle of magnetic induction technology for wireless data communication is basically that of an inductively coupled transformer. This inductively coupled transformer has a very low coupling factor, i.e., the mutual inductance is very small. The transmitter side of the inductively coupled transformer is explained with reference to FIG. 1.

FIG. 1 is a block diagram of a circuit 100, comprising a driving voltage source 102, and a series connection of a capacitor 104, an inductance 106 and a resistor 108. The antenna is formed by inductance 106, implemented by an external coil that is used for both transmitting and receiving, e.g., on a time-division multiplex basis. An RLC tank is formed by resistor 108, capacitor 104 (both on-chip), and external coil 106. Node 110 provides a signal voltage representative of the signal transmitted via inductance 106. The tank needs to have a center frequency equal to the channel frequency. When circuit 100 is used as a transmitter, the tank needs to efficiently transmit an adjustable level. The most power-efficient way to do this is using a non-linear class-D amplifier. As known, a class-D amplifier is a power amplifier wherein the output stage is operated in an on/off mode. Advantages of a class-D amplifier include small size, low power dissipation and a high power-conversion efficiency. The high efficiency is based on having the output stage never operate a linear region. Instead, the output devices are either on or off. Since the RLC-tank is a band-pass filter, only the fundamental signal of the square wave is transmitted. A typical modulation scheme used in the magnetic link is binary frequency-shift keying (FSK). As known, FSK is a frequency-modulation technique wherein the signal is used to modulate a carrier wave by shifting the frequency between values determined in advance. The link transmits digital data at a bit-rate of 300 kbit/s. The modulation frequency can be, e.g., 10.6 MHz or 13.56 MHz. The modulation index is unity, meaning that there is 300 kHz between the two tones that represent a digital zero and a digital one. During a transmission of a single bit one of two frequencies is transmitted, depending on the bit's value.

SUMMARY OF THE INVENTION

In a magnetic link, the voltage on the RLC tank can be relatively high. On the other hand, the maximum (supply) voltage for components made in modern IC technology, e.g., CMOS technology, is decreasing with every new generation. Accordingly, a problem can occur with low-voltage circuitry connected to the RLC tank.

Tuning the RLC tank to a specific frequency is achieved by selectively connecting one or more capacitors to, or disconnecting one or more capacitors from, the RLC tank. If high-voltage switches are being used in series with the tank capacitors, the center frequency of the tank can still be tuned. However, transmission will be hampered by a relatively low efficiency. The reason for this is that the high-voltage switches need a much higher voltage drive to achieve the same on-resistance as do low-voltage switches. Power consumption can be expressed according to the product of switching frequency of the switches, of the capacitance and of the square of the voltage ($f*C*V^2$). Accordingly, the power consumed by the high-voltage switch driver is much higher than the power consumer by a low-voltage switch. For example, for high-voltage switches the drive voltage is 4V, whereas for baseline switches the drive voltage is 1V. As a result, the power dissipated is sixteen times higher.

The invention relates to a device with an electronic circuit for wireless communication of a digital signal. The circuit comprises an RLC tank and a driver for driving the RLC tank. The RLC tank comprises an inductance and multiple capacitors. In order to adjust a transmit level of the device, one or more of the capacitors can be selected for being included in the signal path from the driver to the inductance. In the invention, the driver comprises a plurality of inverters, e.g., CMOS inverters. Each respective one of the inverters is coupled to a node of the inductance via a respective one of the multiple capacitors. The circuit comprises a controller that is configured for selectively driving an input of one or more specific ones of the inverters with the digital signal and connecting inputs of others of the inverters to a supply voltage or to ground. The transmit level can be a fixed set-point or the actual transmit level is measured using, e.g., a comparator, and the controller adjusts the level accordingly by selecting one or more specific ones of the inverters for driving the RLC tank.

A CMOS inverter is a series arrangement of complementarily controlled switches between the supply voltage and ground. In the invention, the peak voltages in the tank will not occur across any of these switches, as the output of the inverter is always connected to either the supply voltage or ground. The inverters can therefore be implemented using low-voltage switches.

In an embodiment of the invention, the RLC tank comprises a further plurality of series arrangements of a further capacitor and a high-voltage switch connected between the inductance and ground. The controller is configured for also controlling the high-voltage switches. By means of selectively connecting the further capacitors into the RLC tank the center tuning frequency is controlled. However, the switch that is set into a non-conducting state will experience the high voltages occurring in the tank. Therefore, these switches are of a type that can withstand high-voltages. Suitable high-voltage devices are known from, e.g., flash-memory technology.

In a further embodiment, the controller is configured for dynamically controlling the high voltage switches in operational use of the device. For example, a change in the center tuning frequency can occur if an electrically conductive material is moving in close proximity of the inductance. If the controller detects such a change, it can dynamically compensate for this change by selectively adding or removing one or more of the further capacitors. For example, the device has an onboard RSSI (received signal strength indicator) that measures the level of the signal at the RLC tank. In an unused timeslot, the controller causes a "zero"-signal and a "one"-signal to be transmitted, and looks for the settings of the capacitors for which the levels of these test signals are equal. If the levels are equal, the tank is tuned. A setting depends on which inverter(s) are actively driving the tank via their respective capacitors. Alternatively, the center frequency is transmitted in an unused timeslot and the setting is determined for which the associated transmit level is maximum.

The invention also relates to an electronic circuit, e.g., an integrated circuit, for use in a device for wireless communication of a digital signal. The circuit comprises: a node for connecting an inductance thereto; multiple capacitors; a driver having a plurality of inverters, each respective one of the inverters being coupled to the node via a respective one of the multiple capacitors; and a controller configured for selectively driving an input of one or more specific ones of the inverters with the digital signal and connecting inputs of others of the inverters to a supply voltage or ground in operational use of the device. In an embodiment, the circuit comprises a further plurality of series arrangements of a further capacitor and a high-voltage switch connected between the node and ground. The controller is configured for controlling the high-voltage switches. In a further embodiment, the controller is configured for dynamically controlling the high-voltage switches in operational use of the device.

Such an IC can be supplied to a set-maker assembling a device as specific above. For example, an embodiment of the invention relates to an IC for a wireless magnetic link that covers distances in the order of 10 cm to 1 m. Such an IC can be used in, e.g., hearing instruments, wireless headphones, wireless headsets, wireless sensors to communicate a sensed quantity such as, e.g., heart rate, blood pressure, etc.

As an example, wireless ear-to-ear communication is implemented through the magnetic link in order to implement audio zoom functionality. Hearing-aids users would like to be able to zoom in on a certain audio source, e.g. the person they are talking to, when there is a lot of background noise present ("cocktail party" effect). In order to do this, two audio sources are needed with a relatively large distance between them. In this case, the two hearing instruments are used (a single instrument being referred to above as "device"), one in each ear, and typically located 16 cm apart. Combining the two signals received, the zoom functionality can be implemented (i.e., the attenuation of the background noise with respect to the desired audio source). The bi-directional wireless link is used to implement this zoom functionality. Now the two audio signals are present in each ear and can be combined, thus realizing zoom functionality. As a result, the hearing-impaired person experiences improved communication in a noisy environment.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

Figure 1:
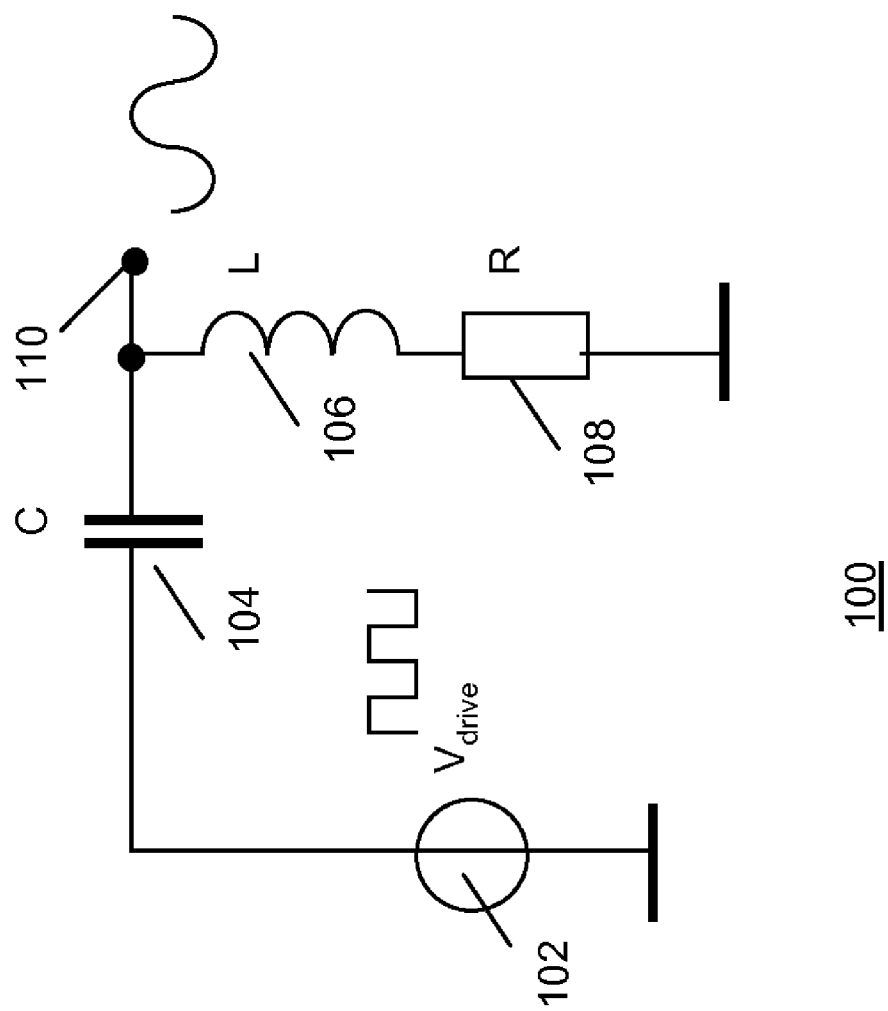
FIG. 1 is a block diagram of a circuit for wireless communication of a digital signal using a magnetic link.
Figure 2:
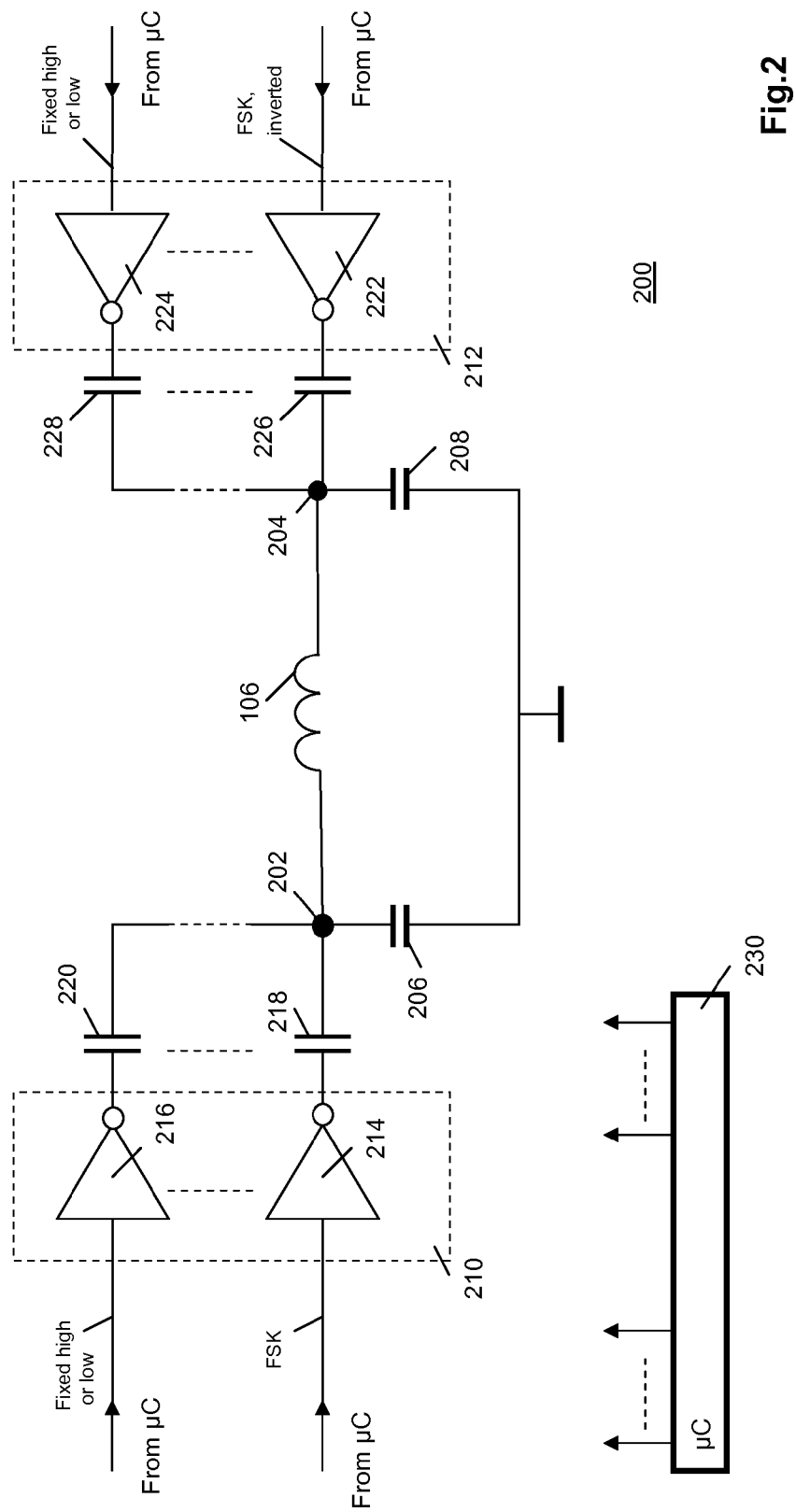
FIGS. 2 and 3 are diagrams of circuits in accordance with the invention.

FIG. 2 is a diagram of an example 200 of a circuit in the invention, used in the differential signaling transmitting mode with an FSK modulation scheme. Circuit 200 comprises inductance 106 between a node 202 and a node 204. Inductance 106 serves as the antenna. Node 202 is connected to signal-ground via a capacitor 206, and node 204 is connected to signal-ground via a capacitor 208. Circuit 200 comprises drivers 210 and 212 for driving antenna 106 in a differential-signaling mode.

Driver 210 comprises a plurality of inverters 214, . . . , 216 having their outputs connected to node 202 via capacitors 218, . . . , 220, respectively. Driver 212 comprises a plurality of inverters 222, . . . , 224 having their outputs connected to node 204 via capacitors 226, . . . , 228, respectively. Only two inverters per driver have been drawn, but more than two inverters per driver can be used. In an embodiment of circuit 200, the inverters are made in a CMOS process. Active devices implemented in CMOS only consume power while switching states. A CMOS inverter is basically a series arrangement of complementarily controlled switches arranged in series between the supply voltage and ground.

In this example, capacitors 206 and 208 have been configured for a fixed center tuning frequency. Capacitors 218, . . . , 220, 226, . . . , 228 are used for setting the transmit level. It is assumed in this example that compensation for process parameter spread and for variations in the inductance of coil 106 is not needed or has been taken care of in manners not involving capacitors 206 and 208. A controller 230 controls the inputs of inverters 214, . . . , 216, 222, . . . , 224. Controller 230 selects one or more specific ones of inverters 214-216, e.g., inverter 214, and one or more specific ones of inverters 222-224, e.g., inverter 222, to receive the differential signal to be transmitted, and ties the input of the other inverters to either the positive supply voltage or the negative supply voltage. The total capacitance connected to the tank stays constant, but the transmit level is determined by those among capacitors 218-220, 226-228 that are connected to the output of the inverters being driven by the signal to be transmitted. By selecting the inverters to be driven, controller 230 adjusts the transmit level. The capacitors contributing to the transmit level are referred to as "switching capacitors". By means of tying the inputs of a particular one of inverters 214-216 to the supply voltage or ground, the associated one of capacitors 218-220 is connected between node 202 and signal-ground, as are capacitors 206 and 208.

In an embodiment, capacitors 218-220 and capacitors 226-228 have all the same capacitance values. In an alternative embodiment, the capacitance values of capacitors 218-220 and of capacitors 226-228 are different, so long as the capacitance values of switching capacitors among capacitors 218-220 (i.e., the ones driven by the active ones of inverters 214-216) are pair-wise equal to the capacitance values of switching ones among capacitors 226-228 (i.e., the ones driven by active ones of inverters 222-224). The transmit level is determined by the ratio of the capacitance of the switched capacitors to the total tank capacitance, in addition to the quality factor (Q-factor) of the tank and the supply voltage.

In operational use, drivers 210 and 212 cause relatively high peak-to-peak voltages in antenna 106, much higher than the supply voltage of drivers 210 and 212. Inverters 214-216 and 222-224, however, can be implemented in CMOS with the usual complementarily controlled low-voltage switches connected in series between the supply voltage and ground. As one of these low-voltage switches is always conducting when the other one is blocking, a peak voltage at node 202 or node 204 will never give rise to a high voltage across these low-voltage switches.

Figure 3:
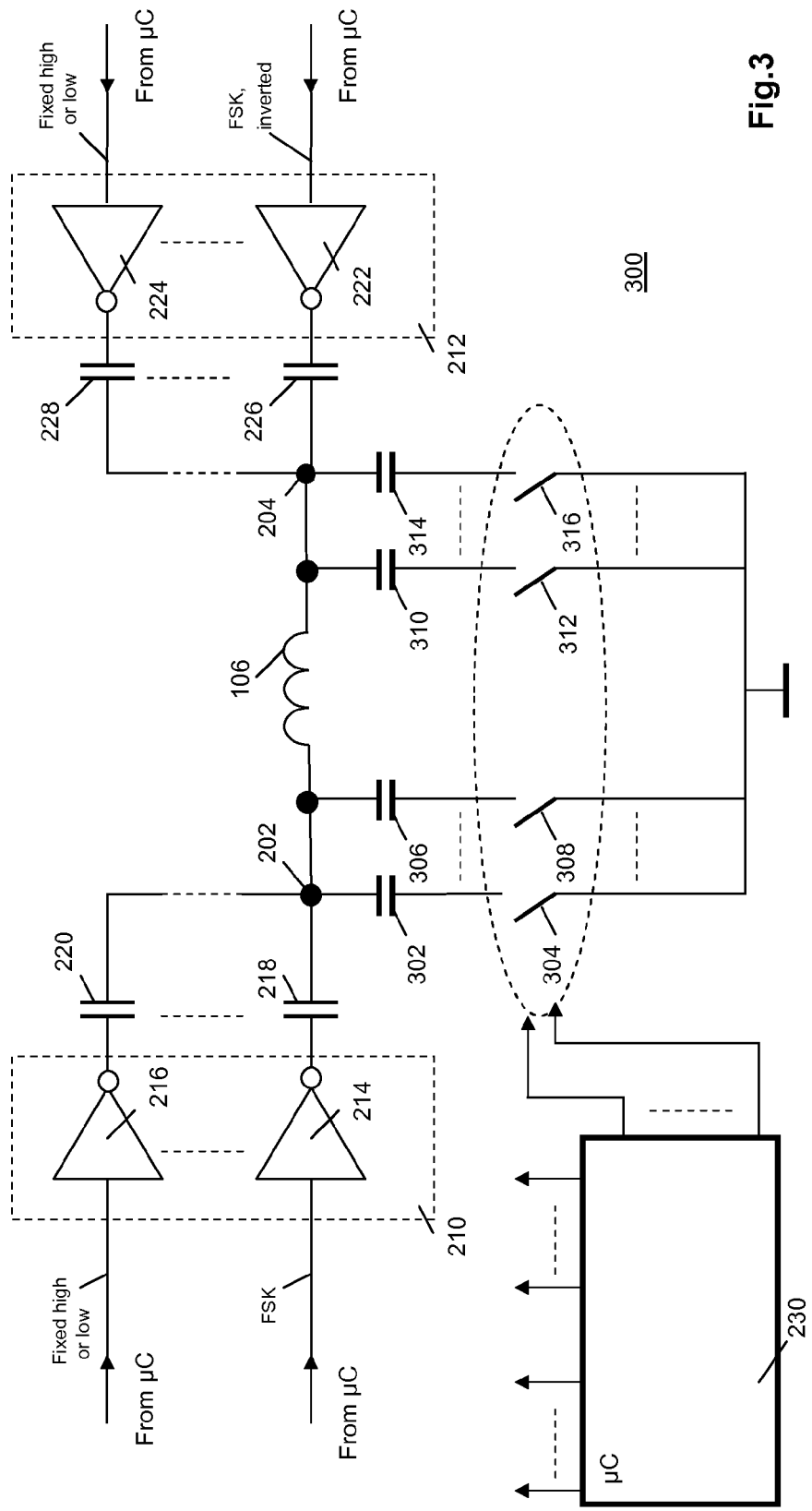

FIG. 3 is another example 300 of a circuit in the invention. Circuit 300 differs from circuit 200 in the following. Capacitor 206 has been replaced by multiple series arrangements of capacitors and switches, such as capacitor 302 and switch 304 connected in series, and capacitor 306 and switch 308 connected in series. Similarly, capacitor 208 has been replaced by multiple series arrangements of capacitors and switches, such as capacitor 310 and switch 312 connected in series, and capacitor 314 and switch 316 connected in series. Switches 304, . . . , 308, 312, . . . , 316 are controlled by controller 230. Selective control of the switches enables to compensate for, e.g., process parameter spread and for variations in the inductance of coil 106. With respect to the latter, the compensation can be carried out dynamically, for example, in response to a metal object being brought closer to coil 106.

In a CMOS embodiment, each of switches 304, ..., 308, 312, ..., 316 is, e.g., a single transistor or a pass-gate (being a parallel arrangement of conduction channels of two field effect transistors of complementary conductivity type. Now, in operational use, drivers 210 and 212 cause relatively high peak-to-peak voltages in antenna 106, much higher than the supply voltage of drivers 210 and 212. Accordingly, if controller 230 has put a specific one of switches 304, ..., 308, 312, ..., 316 into a non-conducting state, this specific switch receives the full peak-to-peak voltage across its drain-source path. Therefore, switches 304, ..., 308, 312, ..., 316 are implemented as high-voltage switches. In CMOS, this means that the transistor(s) implementing a high-voltage switch have a thicker gate oxide than a low-voltage switch. Note that inverters 214-216 and 222-224 can be implemented with the usual complementarily controlled low-voltage switches connected in series between the supply voltage and ground. As one of these low-voltage switches is always conducting when the other one is blocking, a peak voltage at node 202 or node 204 will never give rise to a high voltage across these low-voltage switches.

The inverters driven by the signal to be transmitted is now consuming relatively low power. The power consumption is also proportional to the actual transmit level: a higher transmit level is achieved by driving inductance 106 via a larger one of capacitors 218-220 (and of capacitors 226-228). However, the ratio between transmit power and power losses remains equal. The actual transmit level is proportional to the capacitor that is being driven, divided by the total tank capacitance.

In the examples shown, coil 106 is driven in a differential-signaling mode. As is clear, a single-ended signaling arrangement is feasible as well using the configuration with high-voltage switches and fixing inverters according to the invention.

The invention claimed is:

1. A device with an electronic circuit for wireless communication of a digital signal, wherein the electronic circuit comprises:
   an RLC tank comprising an inductor and a first plurality of capacitors;
   a driver configured to drive the RLC tank comprising a plurality of inverters, wherein a respective capacitor of the first plurality of capacitors connects each respective inverter of the plurality of inverters to a node of the inductor; and
   a controller configured for selectively driving an input of at least one of the plurality of inverters with the digital signal and connecting inputs of others of the plurality of inverters to one of a supply voltage and ground.

2. The device of claim 1, wherein the RLC tank further comprises:
   a plurality of series arrangements of a second plurality of capacitors and a plurality of high-voltage switches connected between the inductor and ground, wherein the controller is configured for controlling the plurality of high-voltage switches.

3. The device of claim 2, wherein the controller is configured for dynamically controlling the plurality of high-voltage switches during operation of the device.

4. An electronic circuit for use in a device for wireless communication of a digital signal, wherein the electronic circuit comprises:
   a node for connecting an inductor thereto;
   a first plurality of capacitors;
   a driver having a plurality of inverters, wherein a respective capacitor of the first plurality of capacitors connects each respective inverter of the plurality of inverters to the node; and
   a controller configured for selectively driving an input of at least one of the plurality of inverters with the digital signal and connecting inputs of others of the plurality of inverters to one of a supply voltage and ground during operation of the device.

5. The electronic circuit of claim 4, wherein the circuit comprises:
   a plurality of series arrangements of a second plurality of capacitors and a plurality of high-voltage switches connected between the node and ground, wherein the controller is configured for controlling the plurality of high-voltage switches.

6. The electronic circuit of claim 5, wherein the controller is configured for dynamically controlling the plurality of high-voltage switches during operation of the device.

7. The electronic circuit of claim 4, further comprising:
   a second plurality of capacitors connected between the node and ground.

8. The electronic circuit of claim 7, wherein the second plurality of capacitors are configured for a fixed center tuning frequency.

9. The electronic circuit of claim 4, wherein the plurality of inverters are made in a Complementary Metal Oxide Semiconductor (CMOS) process.

10. The electronic circuit of claim 4, wherein all capacitors of the first plurality of capacitors have identical capacitance values.

* * * * *